United States Patent [19]

Masel et al.

[11] Patent Number: 4,632,566
[45] Date of Patent: Dec. 30, 1986

[54] ICE-CREAM MAKING MACHINE

[75] Inventors: Ruben Masel, 16 Hatzabar Street, Kiron; George Valdshtein, Holon, both of Israel

[73] Assignee: Ruben Masel, Kiron, Israel

[21] Appl. No.: 779,979

[22] Filed: Sep. 25, 1985

[30] Foreign Application Priority Data

Sep. 26, 1984 [IL] Israel .................................. 73082

[51] Int. Cl.$^4$ .............................................. A23G 9/00
[52] U.S. Cl. ..................................... 366/149; 62/343; 99/455; 366/102; 366/279
[58] Field of Search ............... 366/144, 145, 147, 149, 366/184, 102, 192–194, 279, 292, 293, 295, 325, 326; 62/342, 343; 99/452, 453, 455

[56] References Cited

U.S. PATENT DOCUMENTS

| 2,622,411 | 12/1952 | Ogden | 366/195 X |
| 2,671,646 | 3/1954 | Lindsey | 366/149 |
| 3,960,368 | 6/1976 | Kishimoto | 366/195 X |
| 4,357,112 | 11/1982 | Davis | 366/149 X |
| 4,518,262 | 5/1985 | Bornemann et al. | 366/144 X |

FOREIGN PATENT DOCUMENTS

119430 11/1959 Argentina .

Primary Examiner—Timothy F. Simone
Attorney, Agent, or Firm—Benjamin J. Barish

[57] ABSTRACT

An ice-cream making machine, comprises a receptacle for receiving the liquid ingredients to be used for making the ice-cream, a cooling duct conveying the ingredients from the receptacle to an ice-cream outlet of the machine, an air inlet into the cooling duct, a rotor including a plurality of blades rotatably driven within the cooling duct and effective to atomize the liquid ingredients as particles mixed in air and to direct freezing, and a valve controlling the rate of flow of the air from the air inlet to the cooling duct thereby enabling the machine to vary the density of the ice-cream produced. The machine includes a further valve for controlling the rate of flow of the liquid ingredients from the receptacle to the cooling duct to selectively effect a first rate of flow for producing ice-cream, a lower rate of flow for producing ices, or a higher rate of flow for producing cooled beverages.

20 Claims, 12 Drawing Figures

ICE-CREAM MAKING MACHINE

BACKGROUND OF THE INVENTION

The present invention relates to ice-cream making machine. One particular application of the invention is for machines of the types commonly used in small retail outlets wherein the ice-cream is made at the time it is ordered by the customer; and another application for the invention is in home ice-cream making units, either constructed as a separate machine or incorporated in the conventional home refrigerator.

Many different types of ice-cream making machines are known, but as a rule they are large, complicated, expensive and take a considerable period of time for making the ice-cream. Moreover, in some of the machines, particularly the less expensive ones, the ingredients used in making the ice-cream are retained in receptacles which are exposed to the ambient temperature and which are uncooled, and which therefore result in early spoilage of their ingredients. Other ice-cream machines of the foregoing type, again the relatively inexpensive ones, are usually designed for making only ice-cream, and sometimes only one type of ice-cream, usually the "soft" type. One attempt to produce an ice-cream making machine having advantages in the above respects is described in Argentine Patent No. 119,430, but this machine proved commercially unsuccessful.

SUMMARY OF THE INVENTION

An object of the present invention is to provide a new, simple, compact and inexpensive ice-cream making machine having advantages in the above respects.

According to a broad aspect of the present invention, there is provided an ice-cream making machine comprising a receptacle for receiving liquid ingredients to be used for making the ice-cream; a cooling duct conveying the ingredients from the receptacle to an ice-cream outlet of the machine; an air inlet into the cooling duct; a rotor including a plurality of blades rotatably driven within the cooling duct and effective to atomize the liquid ingredients as particles mixed in air and to direct them against the wall of the cooling duct; cooling means for cooling the cooling duct to a temperature below 0° C. for instantly freezing the atomized particles when contacting the wall of said cooling duct, and a valve for controlling the rate of flow of the air from the air inlet to the cooling duct, thereby enabling the machine to vary the density of the ice-cream produced. Thus, by allowing the air to enter at a low rate, "hard" ice-cream is produced, and by allowing the air to enter at a relatively large rate, "soft" ice-cream is produced. Preferably, the cooling duct includes a contraction at the air inlet to reduce the pressure thereat, and thereby to increase the rate of inletted air, such that by controlling the air inletted via the valve, the density of the produced ice-cream may be varied over a large range.

In the described preferred embodiment of the invention, the machine includes a further valve for controlling the rate of flow of the liquid ingredients from the receptacle to the cooling duct to selectively effect a first rate of flow for producing ice-cream, a lower rate of flow for producing ices (flavoured or unflavoured), or a higher rate of flow for producing cooled liquid beverages.

Further features and advantages of the invention will be apparent from the description below.

BRIEF DESCRIPTION OF THE DRAWINGS

The invention is herein described, by way of example only, with reference to the accompanying drawings wherein.

DESCRIPTION OF PREFERRED EMBODIMENTS

The ice-cream making machine illustrated in FIGS. 1-4 of the drawings is particularly designed either for use in small retail outlets, such as sidewalk stands, for making ice-cream on demand as and when ordered by the customer, or for use in the home for making ice-cream substantially instantaneously as and when desired by the consumer.

Figures 1, 3:
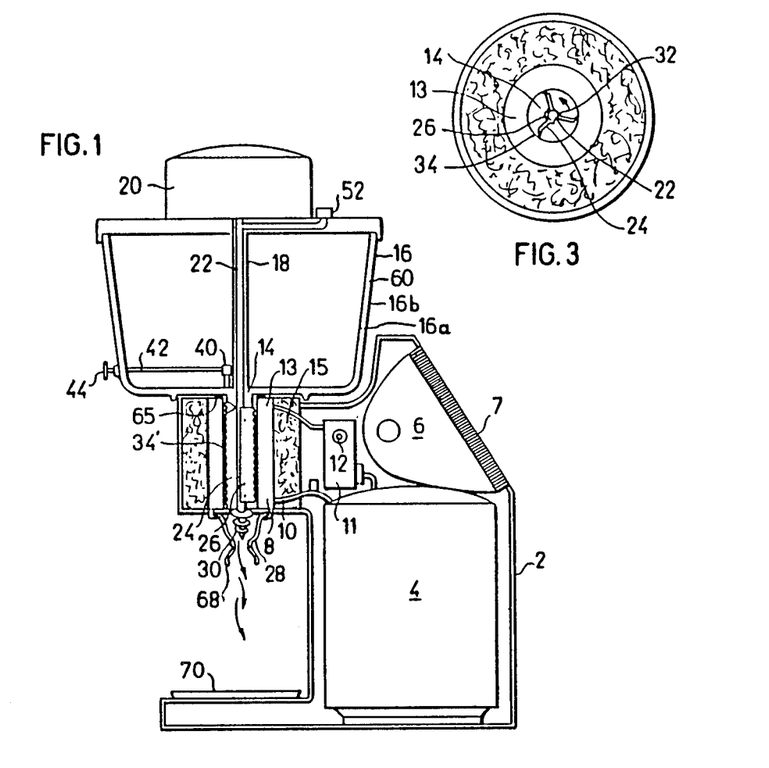
FIG. 1 is a side elevational view of an ice-cream making machine constructed in accordance with the invention.
FIG. 3 is an enlarged sectional view along lines III—III of FIG. 1.

The machine illustrated in FIG. 1 includes a housing, generally designated 2, which houses a refrigeration unit including a compressor 4, a condenser 6 having a radiator 7, a cooling duct 8, and a line 10 conducting the refrigerant gas through a closed cycle including a thermostat 11 having a presettable temperature selector 12. Cooling duct 8 includes an annular passageway 13 for the refrigerant gas around a central passageway 14 for the ice-cream ingredients. The duct is insulated by an external layer 15 of heat-insulation material.

The ingredients used in making the ice-cream are contained in a receptacle 16 supported above and in alignment with the central pasageway 14 of cooling duct 8. Receptacle 16 is of annular shape, and includes a central tubular column 18 open at both ends. A motor 20 is supported above the receptacle. The motor drive shaft 22 passes through tubular column 18 and then through central passageway 14. The lower end of drive shaft 22 disposed within cooling duct 8 carries a plurality (three, in FIG. 3) of blades 24 which are fixed to the shaft in any conventional manner, as for example by means of screw fasteners 26.

The ice-cream is formed within central passageway 14 of cooling duct 8 by the aid of the rotating blades 24, and is expelled through the machine outlet 28 by means of a helicoidal conveyor screw 30 carried at the lower end of the drive shaft 22.

FIG. 3 illustrates the structure of the blades 24. Each blade is formed with a section 32 at one side for securing same to the drive shaft 22 by means of screw fasteners 26, and an angled margin 34 at the opposite side. The edges of the latter margin are serrated as shown at 34' in FIG. 1.

The liquid ingredients are fed into cooling duct 8 by means of a valve 40 disposed at the bottom of receptacle 16 and controlled via a linkage 42 by a knob 44 external to the receptacle. Valve 40 and its knob 44 may be of a known type in which the knob is pushed to open the valve, and is then rotated to any one of several positions to select the rate of flow of the ingredients from receptacle 16 into the central passageway 14 of the cooling duct 8. Preferably, three different feeding rates are provided by the valve, namely: a "normal" rate, for producing ice-cream; a "slow" rate, for producing ices; and a "fast" rate, for merely cooling the liquid passing through the cooling duct.

Valve 40 thus controls the rate of feed of the liquid ingredients into the cooling duct, and thereby enables the machine to be used for producing not only ice-cream, but also ices (flavored or unflavored) or cooled water or liquid beverages.

For purposes of further increasing the capabilities of the machine with respect to the products it can produce, the machine includes an arrangement wherein the amount of air introduced into the cooling passageway 14 can also be preselected, thereby enabling the machine to be used for making either "soft" ice-cream, by using a relatively large quantity of air, or "hard" ice-cream, by using a smaller quantity of air.

For purposes of supplying air to the central passageway 14 of cooling duct 8, the tubular column 18 formed in the center of receptacle 16 is of larger internal diameter than the external diameter of the drive shaft 22, thereby providing an air passageway 50 between the two. The outlet end of air passageway 50 leads to the inlet end of the central passageway 14 of cooling duct 8. The inlet end of the air passageway leads to the atmosphere but is controlled by a valve schematically shown as 52 in FIG. 1.

Figure 4:
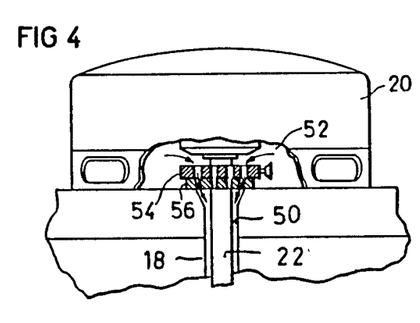
FIG. 4 is an enlarged partially sectioned view of a detail of the machine shown in FIG. 1.

Any suitable air valve could be used. FIG. 4 illustrates one form of air valve 52 as comprising a pair of apertured discs 54, 56, one of the discs (e.g. the upper disc 54) being rotatable with respect to the lower one so as to bring more or less aperture area of that disc into alignment with the aperture area of the other disc.

Rotation of the blades 24 during the operation of the machine produces a negative pressure within passageways 14 and 50, thereby drawing air from the atmosphere through valve 52. The setting of the valve controls the rate of feed of the air therethrough, and therefore the amount of air supplied to passageway 14 of cooling duct 8.

In the machine illustrated receptacle 16 is defined by a pair of spaced walls 16a, 16b, to provide an air space 60 therebetween. Air space 60 is closed at the top by the upper edge of the double-wall receptacle. At the bottom, this air space communicates with the air inlet into the interior of passageway 14 of cooling duct 8. Receptacle 16 is thus in heat-exchange relationship with respect to the cooling duct and its contents are thermally insulated from the atmosphere by air space 60. This arrangement provides a cooled receptacle for the ice-cream ingredients which thereby not only pre-cools them to facilitate their conversion into ice-cream, but also protects them for a longer period of time against spoilage.

Figure 2:
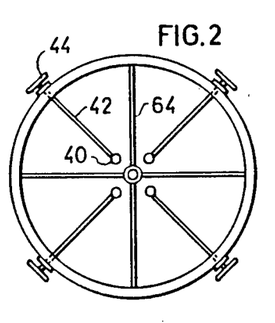
FIG. 2 is an enlarged sectional view along lines II—II of FIG. 1.

Receptacle 16 is preferably of transparent plastic material and may be divided into a plurality of separate compartments by radial partitions 64, as shown in FIG. 2. Thus different ingredients may be included and viewed within these compartments. The receptacle is rotatably mounted by bearings 65 (FIG. 1), and each compartment is provided with a valve 40 and a knob 44. Thus, the knob can select the desired ingredient for introduction into passageway 14 of the cooling duct 8 by operating its respective valve, and can rotate the receptacle to align its selected compartment and valve with passageway 14.

Figure 5:
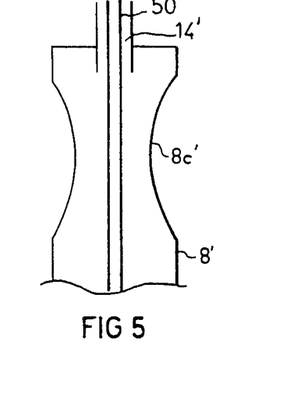
FIG. 5 is an enlarged fragmentary view illustrating a modification in the construction of the cooling duct at the air inlet side thereof.

FIG. 5 illustrates a modification that may be included in the construction of the cooling duct 8 in order to increase the rate of inletted air. Thus, as shown in FIG. 5, the cooling duct, therein indicated 8', is formed with a contraction 8c', communicating with the air inlet to further reduce the pressure within passageways 14' and 50', thereby increasing the rate of flow of the air from the atmosphere into the cooling duct to be mixed with the atomized liquid particles before freezing. The rate of air flow is still controlled by valve 52 (FIG. 1), but the modification of FIG. 5 permits a larger range in the flow rates of air to be admitted into the cooling duct, and thereby a larger range of ice-cream densities capable of being produced.

Ice-cream outlet 28 includes a gate, shown at 68, which is spring-biased closed, but which automatically opens when the ice-cream (or ice or cooled beverage) is expelled through the outlet 28 via screw 30. This gate thus protects the machine from the entry of insects or other dirt into the ice-cream making passageway 14 and also prevents dripping of the ice-cream after an ice-cream production operation has been completed.

The machine includes a table 70 underlying outlet 28 for supporting the container to receive the ice-cream (or ice or cooled liquid) produced by the machine.

The operation of the machine illustrated in the drawings will be apparent from the above description. The liquid ingredients to be used in making the ice-cream (or ices or cooled beverages) are placed within receptacle 16, which receptacle may contain several different types of ingredients in its various compartments for selectively producing several different types of products.

The operator can select the specific product to be produced as and when ordered by the customer. Thus, if the customer orders "soft" ice-cream of a selected ingredient, the operator rotates receptacle 16 to select the appropriate ingredient, and sets air valve 52 to its fully-opened position to permit the maximum air to be drawn through the valve and passageway 50 into the central passageway 14 of cooling duct 8, when blades 24 are rotated by drive shaft 22. In addition, the operator sets valve knob 44 of the selected compartment to its "normal" position, and pulls out the knob to open its valve 40. By this setting of valve 44, the selected liquid ingredients are supplied to cooling duct 8 at the "normal" rate for making ice-cream.

Motor 20 is then energized to rotate its drive shaft 22 and blades 24, whereby the liquid ingredients supplied from receptacle 16 are atomized and mixed with the air supplied from passageway 50, and are directed against the wall of passageway 14 of cooling duct 8. These atomized particles are instantly frozen, producing soft ice-cream which is fed out of the outlet spout 28.

If "hard" ice-cream is desired to be produced, air valve 52 is preset to its "low" position, whereby less air is suplied to the cooling duct.

If the customer orders an ice, rather than ice-cream, valve knob 44 of the respective compartment for that ingredient is moved to its "low" position, whereby the rate of feed of the ingredient into the cooling duct is low, producing ice, flavored or unflavored (e.g. crushed ice), rather than ice-cream. On the other hand, if the customer orders merely a cooled liquid beverage, knob 44 is set to its "high" position, whereby the rate of feed of the selected liquid ingredient is high, thereby merely cooling the liquid.

As pointed out earlier, locating receptacle 16 in heat-exchange relationship to the cooling duct 8, and providing air space 16 around the receptacle, assure that the receptacle will be cooled and maintained cold, thereby protecting the ingredients within the receptacle for a substantial period of time against spoilage, and facilitating their conversion into ice-cream.

Figure 6:
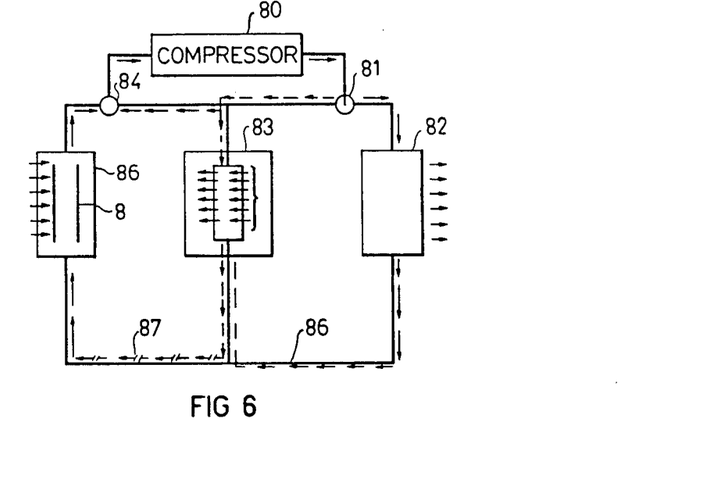
FIG. 6 is a diagram illustrating a two-stage refrigeration system that may be used particularly with respect to home ice-cream making machines.

FIG. 6 is a block diagram illustrating a refrigeration system which may be used in order to provide a small and inexpensive home ice-cream making machine in accordance the above-described construction. The refrigeration system illustrated in FIG. 6 is a two-stage system, including: a charging stage in which a phase-change charging medium, such as water, is cooled and maintained below its freezing temperature; and a production stage, in which the frozen charging medium is used to cool the cooling duct for the production of ice-cream.

The refrigeration system illustrated in FIG. 6 includes a compressor 80 whose outlet end is connected via a valve 81 either to a condenser 82 or to a phase-change charging medium 83. The inlet end of compressor 80 is connected by another valve 84 either to the phase-change charging medium 83 or to the cooling duct 8 in the contruction of FIGS. 1–5, acting as an evaporator. Condenser 82 is connected via conduit 86 to the charging medium 83, and the charging medium is connected via conduit 87 to cooling duct 6.

The two-stage refrigeration system illustrated in FIG. 6 operates as follows:

During the charging stage, valves 81 and 84 are controlled so as to circulate the refrigerant gas from compressor 80, to condenser 82 for rejecting heat to the atmosphere, and then to the phase-changing medium 83 which absorbs heat and thereby freezes. This medium, which as indicated earlier may be water, is thus frozen and continuously maintained frozen during the charging stage.

During the production stage when ice-cream is to be produced, valves 81 and 84 are controlled so as to circulate the refrigerant gas from compressor 80 through the charged medium 83, which acts as the condenser and rejects heat, and via line 87 through cooling duct 8, which acts as an evaporator and absorbs heat.

The arrangement illustrated in FIG. 6 substantially reduces the size of the refrigeration unit and enables the machine to produce a significant quantity of ice cream substantially instantaneously even when embodied in a relatively small unit suitable for home use. As one example, the refrigeration unit may be about one sixth hp, requires a minimum charging time of about one half-hour, and is capable of producing substantially instantaneously about 0.5 kg ice-cream with each such one-half hour previous charge.

Figure 7:
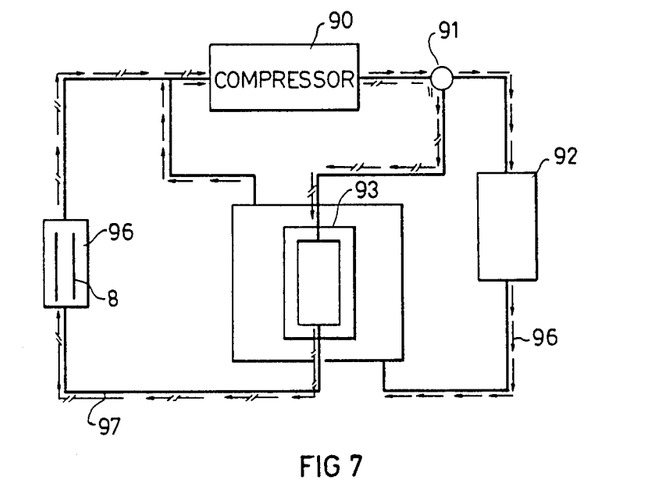
FIG. 7 is a diagram illustrating a refrigeration system that may be used when the ice-cream making machine is incorporated in a conventional home refrigerator.

FIG. 7 is a diagram illustrating a refrigeration cycle which may be used when the ice-cream machine is incorporated in a conventional home refrigerator unit and uses the compressor and condenser thereof also for producing ice-cream. This arrangement also preferably uses a phase-changing medium which is charged during the regular refrigerator cycle and is used as a condenser for rejecting heat during the ice-cream production cycle.

Thus, as shown in FIG. 7, the refrigeration system includes the refrigerator compressor 90 whose outlet end is connected, via valve 91, either to the refrigerator condenser 92 or to a phase-changing charging medium 93, such as water. The refrigerator condenser 92 is connected via line 96 to the phase-changing charging medium 93, and the latter medium is connected via line 97 to evaporator 96 which absorbs heat from the cooling duct 8 in which the ice-cream is produced.

During the regular refrigerator cycle, valve 91 circulates the refrigerant gas from compressor 90 through condenser 92, which rejects heat, and through the charging medium 93, which absorbs heat and thereby freezes. During the ice-cream production stage, valve 91 circulates the refrigerant gas from compressor 90 through the charging medium 93 and evaporator 96 so that the evaporator absorbs heat to cool the cooling duct 8 for the production of ice-cream while the charging medium 93 serves as a condenser to reject the heat.

Figure 8:
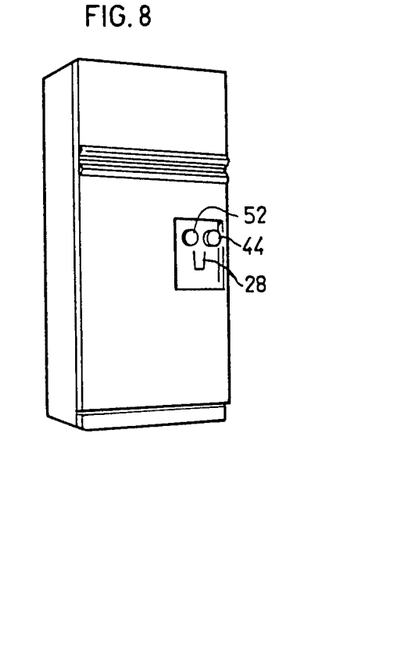
FIG. 8 illustrates one arrangement for incorporating the ice-cream making machine in a conventional home refrigerator.

In the embodiment illustrated in FIG. 7, the cooling duct 8 within the evaporator 96 is of relatively small size and therefore could be incorporated in the refrigerator door together with the ice-cream outlet as shown in FIG. 8. Thus the knobs 44 for selecting the liquid ingredients, and rate of flow, introduced into the cooling duct 8, and knob 52 for selecting the rate of flow of the air inletted into the cooling duct, could both be mounted on the external side of the door, together with the ice-cream outlet 28, so that the user can dispense soft ice-cream, hard ice-cream, ices (flavored or unflavored), or merely a cold liquid, by the appropriate operation of these knobs, without opening the refrigerator door.

Figure 9:
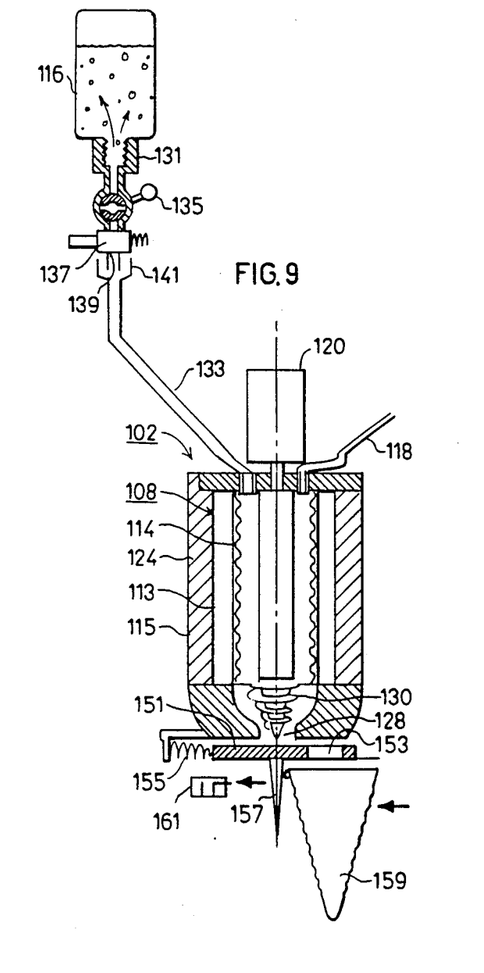
FIG. 9 illustrates a further form of ice-cream making machine in accordance with the invention.

FIG. 9 illustrates a further form of ice-cream making machine including a number of modifications over the machines described above.

The machine illustrated in FIG. 9, therein designated 102, also includes a cooling duct 108 having an annular passageway 113 for the refrigerant gas and a central passageway 114 for the ice-cream ingredients, and also for the air introduced via an inlet 118. The refrigerant gas system, including the compressor and the condenser, are not illustrated in FIG. 9 but may be as described above. FIG. 9 does illustrate the thermal insulation 115 around passageway 113 for the refrigerant gas, the electric motor 120, and the serrated blades 124 rotatable within passageway 114 receiving the liquid ingredients and the air.

In the machine illustrated in FIG. 9, the receptacle for introducing the liquid ingredients is in the form of an inverted bottle 116 coupled by a coupling member 131 and a tube 133 to the inlet of passageway 114 of the cooling duct 108. Coupling 130 further includes a regulator valve 135 for controlling the rate of feed of the ingredients into the latter passageway. Coupling 131 further includes a valve 137 whose output tube 139 overlies a funnel-shaped member 141 at the end of inlet tube 133.

The above-described arrangement permits the liquid ingredient in bottle 116 to be introduced at a relatively slow, regulated rate, thereby obviating the need for small openings which are easily clogged if the liquid ingredients are very viscous or include solid particles such as citrus pulp. Thus the outletting of the liquid ingredients from bottle 116 into tube 133 is slowed down by the inletting of air into the bottle via the space between funnel 140 and outlet tube 139, the outlet rate being regulated by manipulating regulator valve 135.

Valve 137 is an on/off valve for starting and terminating the flow of the liquid ingredients into the machine. This valve may be a simple slide valve manually movable by the user, or it could be an electromagnetic valve operated by the insertion of a coin when the invention is embodied in a coin-operated machine.

The ice-cream (or ice or cooled beverage, as described above) is expelled from passageway 114 via screw 130, as in the above-described embodiments.

The output end of the machine illustrated in FIG. 9 is also modified from that described above. Thus, underlying the ice-cream outlet 128 of the machine is a gate 151 having an outlet opening 153 alignable with outlet 128 of passageway 114. Gate 151, however, is urged to a closed position with respect to passageway 128 by means of a spring 155. Depending from gate 151 is an operator 157 which is engageable by a container 159 when introduced under the outlet opening 128, to move gate 151 to its open position wherein its opening 153 is aligned with the ice-cream outlet 128.

Thus, gate 151 is normally in its closed position, thereby preserving the coldness within cooling duct 108 and preventing the entry of dirt; and whenever the machine is operated and the user wishes to dispense ice-cream, he merely places container 159 against gate operator 157 to move gate 151 to its open condition with its opening 153 in alignment with outlet 128.

Operator 157 could also be used to actuate a switch 161 for starting motor 120 of the machine and/or for actuating slide valve 137 to its open position.

Figure 10:
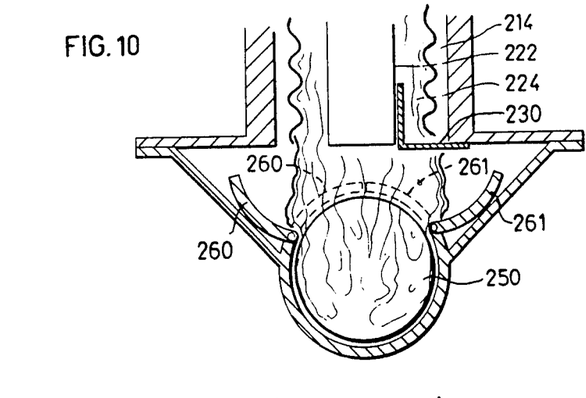
FIGS. 10-12 illustrate further variations.
Figure 11:
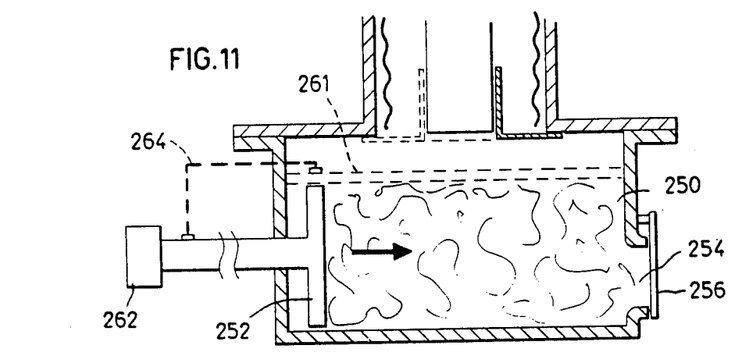
Figure 12:
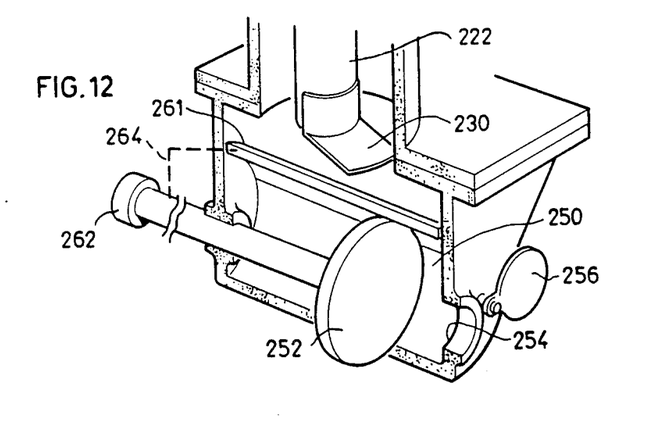

FIGS. 10–12 illustrate a further variation at the outlet end of the machine particularly for avoiding mixing the ice-cream of one batch with that of another. Thus, a conveyor screw (30, FIG. 1) is omitted, and instead there is provided a severing blade 230 carried at the lower end of the drive shaft 222 for the rotor blades 224 at the outlet end of the ice-cream forming passageway 214. The machine further includes an ice-cream receiver compartment 250 at the ice-cream outlet, and an ejector 252 for ejecting the ice-cream from compartment 250 through an outlet opening 254 normally closed by a lid 256. Ice-cream receiver compartment 250 includes a pair of walls 260, 261 which are normally in an open position, (full lines, FIG. 10) but which are pivoted to a closed position, (broken lines, FIG. 10) after all the ice-cream for that batch has been received and is to be ejected from the compartment through outlet opening 254. In the arrangement illustrated in FIGS. 10–12, ejector piston 252 is of circular configuration, and therefore compartment 250, when the walls 260, 261 are pivoted to their closed positions, is of cylindrical configuration having a diameter substantially equal to that of piston 252 so that substantially all the ice-cream in compartment 254 is ejected therefrom with each operation of the piston.

In FIG. 11, piston 252 is shown schematically as being operated by a manual button 262, which button includes a connection 264 to the two pivotable walls 260, 261 for pivoting them to their closed positions just before piston 252 is moved by the depression of button 262 through the ice-cream receiving chamber 250.

The arrangement illustrated in FIGS. 10–12 operates as follows:

As the ice-cream is produced by the rotation of the rotor blades 224, the ice-cream is also severed by the rotation of the severing blade 230 causing the ice-cream to drop by gravity into the receiver compartment 250, while its wall 260, 261 are in their open positions as illustrated in full-lines in FIG. 10. For each operation, a predetermined quantity of the liquid ingredients is supplied to the machine and ends up as ice-cream in compartment 250. The ice-cream in that compartment may then be ejected by pressing button 262 which first causes walls 260, 261 to pivot to their closed positions, and then causes piston 252 to move through compartment 250 ejecting the ice-cream through outlet opening 254. Lid 256 normally, closes the latter opening but it may be manually pivoted to its open position, as shown in FIG. 12, or it may be moved to its open position by the ejection of the ice-cream through opening 254.

While the invention has been described with respect to several preferred embodiments, it will be appreciated that many other variations, modifications and applications of the invention may be made.

What is claimed is:

1. An ice-cream making machine, comprising:
    a receptacle for making liquid ingredients to be used for making ice-cream;
    an ice-cream outlet;
    a cooling duct having an inner face along which the ingredients from the receptacle are conveyed to said ice-cream outlet;
    an air inlet into said cooling duct;
    a rotor including a plurality of blades rotatably driven within said cooling duct and effective to atomize the liquid ingredients as atomized particles mixed in air and to direct them against the inner face of said cooling duct;
    cooling means for cooling said cooling duct to a temperature below 0° C. for instantly freezing the atomized particles when contacting the inner face of said cooling duct
    and a valve for controlling the rate of flow of the air from said air inlet to said cooling duct, to vary the density of the ice-cream produced.

2. The machine according to claim 1, wherein said receptacle is in heat-exchange relationship with said cooling duct for being cooled thereby, and includes a pair of spaced walls defining an air space there between which air space communicates with said air inlet into said cooling duct.

3. The machine according to claim 1, further including:
    a further valve for controlling the rate of flow of the liquid ingredients from said receptacle to said cooling duct to selectively effect a first rate of flow for producing ice-cream, a lower rate of flow for producing ices, or a higher rate of flow for producing cooled liquid beverages.

4. The machine according to claim 1, wherein the receptacle is divided into a plurality of compartments selectively connectable to said cooling duct; said receptacle being rotatably mounted to selectively locate one of said compartments in communication with said cooling duct.

5. The machine according to claim 1, wherein said valve for controlling the rate of flow of the air from the air inlet to the cooling duct comprises a pair of apertured discs, one of the discs being rotatable with respect to the other so as to bring more or less apertured area of the one disc into alignment with the apertured area of the other disc.

6. The machine according to claim 1, wherein said blades of the rotor are serrated at their outer edges.

7. The machine according to claim 1, wherein the ice-cream outlet of the machine includes a helicoidal conveyor screw for expelling therefrom the ice-cream produced within the cooling duct.

8. The machine according to claim 1, wherein said cooling duct includes a contraction at the air inlet to reduce the pressure at said inlet and thereby to increase the quantity of air inletted.

9. The machine according to claim 1, wherein said cooling means comprises an annular chamber around said cooling duct and in good heat-exchange relationship therewith; and refrigeration means including a refrigerant gas expanded in said annular chamber for cooling same.

10. The machine according to claim 9, wherein said refrigeration means comprises a 2-stage system, including a charging stage in which a phase-change charging medium is cooled to and maintained below its freezing temperature, and a production stage in which said refrigeration means, including its charging medium, is used to cool said cooling duct to a temperature below freezing.

11. The machine according to claim 10, wherein said refrigeration system comprises a compressor, an evaporator for absorbing heat from said cooling duct, a condenser for rejecting heat to the atmosphere, and valve means effective during the charging stage to circulate the refrigerant gas from the compressor through the condenser and charging medium to charge same, and during the production stage to circulate the refrigerant gas from the compressor through the charging medium and the cooling duct.

12. The machine according to claim 9, wherein said machine is incorporated into a refrigerator and utilizes the refrigerator compressor and condenser for cooling said cooling duct.

13. The machine according to claim 12, wherein said refrigerator operates according to two cycles, including the normal refrigeration cycle for cooling the contents of the refrigerator, and an ice-cream production cycle in which the refrigerator is used to cool the cooling duct to a temperature below freezing.

14. The machine according to claim 13, wherein said refrigeration system further includes a phase-change charging medium and valve means effective during the refrigeration cycle to circulate the refrigerant gas from the refrigerator compressor through the refrigerator condenser and the phase-change charging medium to freeze same, and during the ice-cream production cycle to ciculate the refrigerant gas from said compressor through the phase-change charging medium and the cooling duct.

15. The machine according to claim 12, wherein said cooling duct and ice-cream outlet are incorporated in the door of the refrigerator.

16. The machine according to claim 1, wherein said inlet from the receptacle includes a coupling for coupling same to said cooling duct and to an inverted bottle for the liquid ingredients, while permitting air to be inletted into said inverted bottle during the outletting of the liquid ingredients therefrom.

17. The machine according to claim 1, wherein said inlet from the receptacle further includes an on/off valve.

18. The machine according to claim 1, wherein said ice-cream outlet comprises a gate including an operator engageable by the container when introduced under said ice-cream outlet to open said gate.

19. The machine according to claim 1, further including an ice-cream receiver compartment at said ice-cream outlet, a severing blade between the outlet end of said cooling duct and said receiver compartment, and an ejector for ejecting the ice-cream received in said receiver compartment after having been severed by said severing blade.

20. The machine according to claim 19, wherein said severing blade is attached to said rotor to be rotated therewith, said receiver compartment includes a pair of walls which are pivotably mounted to an open position for receiving the ice-cream and pivotable to a closed position before the ejection of the ice-cream by said ejector, and said ejector comprises a piston movable through said receiver compartment after said walls have been pivoted to their closed positions.

* * * * *

UNITED STATES PATENT AND TRADEMARK OFFICE
CERTIFICATE OF CORRECTION

PATENT NO. : 4,632,566
DATED : December 30, 1986
INVENTOR(S) : Ruben Masel and George Valdshtein It is certified that error appears in the above-identified patent and that said Letters Patent is hereby corrected as shown below:

In the Abstract, line 8, after "direct" insert
-- them against the wall of the cooling duct for instant --.

Column 8, line 31, before "liquid" change "making" to -- receiving --.

Signed and Sealed this

Twenty-fourth Day of May, 1988

*Attest:*

DONALD J. QUIGG

*Attesting Officer*    *Commissioner of Patents and Trademarks*